(12) United States Patent
Fitzell, Jr.

(10) Patent No.: US 7,045,086 B2
(45) Date of Patent: May 16, 2006

(54) TWINSHEET THERMOFORMING SYSTEM AND METHOD

(75) Inventor: James Richard Fitzell, Jr., Flushing, MI (US)

(73) Assignee: Soroc Products, Inc., Burton, MI (US)

( * ) Notice: Subject to any disclaimer, the term of this patent is extended or adjusted under 35 U.S.C. 154(b) by 0 days.

(21) Appl. No.: 10/388,080

(22) Filed: Mar. 13, 2003

(65) Prior Publication Data

US 2004/0178543 A1 Sep. 16, 2004

(51) Int. Cl.
| | |
|---|---|
| B29C 51/10 | (2006.01) |
| B29C 51/42 | (2006.01) |
| B32B 37/06 | (2006.01) |
| B32B 37/18 | (2006.01) |
| B32B 38/12 | (2006.01) |

(52) U.S. Cl. ............ 264/250; 264/545; 156/245; 156/292; 156/359; 156/500; 425/504; 425/508

(58) Field of Classification Search ........... 264/241, 264/248, 250, 545; 156/242, 245, 292, 500; 425/500, 504, 508, 519
See application file for complete search history.

(56) References Cited

U.S. PATENT DOCUMENTS

| | | | |
|---|---|---|---|
| 3,398,434 A * | 8/1968 | Alesi, Jr. et al. | 425/504 |
| 3,412,183 A | 11/1968 | Anderson | |
| 3,695,799 A * | 10/1972 | Held, Jr. | 425/504 |
| 3,783,076 A | 1/1974 | Broadhead | |
| 3,814,562 A * | 6/1974 | Diamond | 425/174.4 |
| 3,867,088 A * | 2/1975 | Brown et al. | 425/504 |
| 3,925,140 A * | 12/1975 | Brown | 156/382 |
| 4,039,643 A * | 8/1977 | Dean et al. | 264/545 |
| 5,401,456 A | 3/1995 | Alesi, Jr. | |
| 5,620,715 A * | 4/1997 | Hart et al. | 425/143 |
| 5,800,843 A * | 9/1998 | Kappelmuller et al. | 425/150 |
| 5,800,846 A * | 9/1998 | Hart | 425/504 |
| 5,814,185 A * | 9/1998 | Chun et al. | 156/580 |

(Continued)

FOREIGN PATENT DOCUMENTS

DE        33 03 465    *   8/1984

(Continued)

OTHER PUBLICATIONS

English language translation of German Patent DE-3303465-A1 dated Jul. 22, 2004 by Katia I. Suletzki of Latitude48 Translation.

Primary Examiner—Melvin Mayes
(74) Attorney, Agent, or Firm—Warner Norcross & Judd

(57) ABSTRACT

A simultaneous twinsheet thermoforming system having a carousel rack to simultaneously move two sheets of thermoplastic together through a heating station and a forming station. The two thermoplastic sheets are vertically disposed on upper and lower tiers of the rack. The single heating station includes vertically disposed upper and lower ovens, which both sheets pass through simultaneously. The ovens each include upper and lower heating platens, the lower platens being movable to accommodate for sagging thermoplastic. The forming station includes upper and lower vacuum molds that are movable from an open position to a closed position. In the open position, the two sheets are moved in between the mold faces. The molds are driven together to contact the sheets and simultaneously form the two sheets to the two molds. At least one of the two molds is further moved to establish contact between at least portions of the two sheets, thus fusing them together.

27 Claims, 6 Drawing Sheets

U.S. PATENT DOCUMENTS

| | | | |
|---|---|---|---|
| 5,843,366 A * | 12/1998 | Shuert | 264/545 |
| 6,086,354 A * | 7/2000 | Dresen et al. | 425/504 |
| 6,379,606 B1 * | 4/2002 | Chun et al. | 264/545 |
| 6,454,557 B1 * | 9/2002 | Chun et al. | 425/397 |
| 6,648,043 B1 * | 11/2003 | Kundinger et al. | 156/499 |
| 6,659,758 B1 * | 12/2003 | Ekendahl et al. | 425/504 |
| 6,705,853 B1 * | 3/2004 | Nehring | 425/504 |
| 2002/0017745 A1 * | 2/2002 | Vorenkamp et al. | 264/492 |

FOREIGN PATENT DOCUMENTS

WO        91/01870    *   2/1991

* cited by examiner ial properties allow it to be fused with another sheet. After a sheet is heated and formed,
TWINSHEET THERMOFORMING SYSTEM AND METHOD

BACKGROUND OF THE INVENTION

The present invention relates to thermoforming and more particularly to a method and apparatus for twinsheet forming thermoplastics.

Thermoforming is widely used in a variety of industries to manufacture products from thermoplastic materials. A typical thermoforming process involves the general steps of heating a sheet of thermoplastic material above its glass-transition temperature, shaping the heated thermoplastic by drawing the material over a thermoforming tool, such as a vacuum mold, cooling the thermoplastic to a low enough temperature for it to retain shape and then removing the shaped thermoplastic from the mold.

In a twinsheet thermoforming process, two sheets of thermoplastic are individually formed and then fused together to complete a single article. According to conventional twinsheet forming methods, first and second sheets of thermoplastic material are heated and thermoformed using first and second thermoforming tools, such as vacuum molds, positioned opposite one another. Before the sheet surfaces facing away from the tools have cooled, the tools are moved together or closed so that the hot surfaces of the sheets fuse together proximate the edges or in any other area that protrudes and contacts the opposing sheet. The residual heat and soft surface of the thermoplastic materials allows the sheets to fuse together.

One type of conventional twin sheet thermoforming system 10, FIG. 1, uses a carousel machine to form two thermoplastic sheets and fuse them together. The carousel machine has four stations 20, 22, 24, 26 and uses four clamp frames to rotate and index the sheets 90 degrees to each of the stations. The sheets are loaded sequentially at a load/unload station 20, for example, by clamping the first sheet with a clamp frame, indexing the carousel, and then clamping the second sheet with a clamp frame. The clamp frames are then sequentially indexed through first and second heating stations 22, 24. For example, the first sheet is heated in the first heating station 22 while the second sheet is loaded. The carousel then rotates 90 degrees to move the first sheet to the second heating station 24 and the second sheet to the first heating station 22. The two sheets are then simultaneously heated in the separate heating stations.

After being appropriately heated, the carousel is again indexed forward 90 degrees to move the first sheet to the forming station 26 and the second sheet to the second heating station 24. The forming station 26, includes upper and lower platens that support opposing upper and lower vacuum molds. After entering the forming station, the first sheet is formed in one vacuum mold. While the first sheet is being formed, the second sheet is maintained at the appropriate temperature at the second heating station 24. Once the first sheet is formed, it is released from the clamp frame. The carousel is then indexed forward 90 degrees to move the second sheet to the forming station 26. Because it has been released from the clamp frame, the first sheet remains on the mold. The second sheet is then formed in the other vacuum mold. The upper and lower platens are then driven together, causing the two thermoformed sheets to come into contact under pressure at various locations. The causes the two sheets to fuse together to form a completed part. The complete part is then indexed to the load/unload station 20 for unloading.

Problems arise in conventional twinsheet arrangements when fusing the first and second sheets together. In order to obtain proper fusion between two thermoplastic sheets, each sheet must be properly formed and then maintained at a high enough temperature that its material properties allow it to be fused with another sheet. After a sheet is heated and formed, there is only a small window of time in which the material is still capable of being fused. Beyond this time, the material has cooled to a point that it has become too hard to be fused with another thermoplastic.

The conventional four-station carousel system presents an obstacle to proper fusion in that it requires the second sheet to be heated and formed at a time later than the first sheet. As a result, the first sheet begins to cool while the second sheet is still forming, causing a temperature difference between the two sheets and further shrinking the window of time for proper fusion. A weak bond between the first and second sheets often results from the sequential timing of the conventional system, and in a worst case scenario the first sheet has cooled so much during the forming of the second sheet that no amount of fusion is possible. Certain thermoplastic materials, such as ABS and acrylic, have a very tight range of temperatures in which they are capable of being thermoformed and fused, and are incapable of being properly formed in the conventional twinsheet process because the sequential system cannot accommodate their short cooling time window.

Accordingly, a need exists for a twinsheet forming system capable of coordinating the heating, forming, and cooling times of the first and second thermoplastic sheets such that both sheets are formed and at a proper temperature for fusion at the same time in the process.

SUMMARY OF THE INVENTION

The aforementioned problems are overcome by the present invention wherein a thermoforming apparatus is provided to simultaneous heat and form two sheets into a twinsheet product. The simultaneous system utilizes a carousel rack to rotate two sheets of thermoplastic together through a heating station and a forming station. Unlike the prior art, the present invention includes only a single heating station, capable of heating both sheets at the same time. The sheets are therefore transferred to the forming station at equal temperatures, enabling stronger fusion after the sheets are formed.

In a preferred embodiment, the twinsheet system includes a carousel rack machine with three stations. A first station for loading and unloading thermoplastic sheets, a second station for heating the sheets, and a third station for forming and fusing the sheets. The carousel includes upper and lower tiers of clamped racks for clamping and rotating the thermoplastic sheets 120 degrees through the stations.

In another preferred embodiment, the heating station includes a first and second oven. The first oven is disposed above the second oven. Each oven includes upper and lower heating platens. The platens define horizontal gaps that the upper and lower clamped frames containing thermoplastic sheets can rotate through. Further, each oven is equipped with a sensor for measuring the displacement of the melting thermoplastic. The sensors trigger motors that translate platens up and down relative to the clamped frame to prevent the displaced thermoplastic from contacting the oven.

In another preferred embodiment the forming station includes upper and lower vacuum molds. The molds are facing each other and are movable from an open to a closed position. In the open position, the mold faces are apart allowing the upper and lower sheets to be rotated between the molds. The molds are actuated by motors such that they may be driven toward each other in two stages. In the first stage, the molds are moved into contact with the upper and lower thermoplastic sheets for thermoforming. In the second stage, the molds are moved further, pressing the two sheets together at select locations, thereby fusing the two sheets into a single twinsheet product.

The present invention also provides a method for simultaneous twinsheet thermoforming. The method generally includes the steps of (a) loading two thermoplastic sheets, (b) simultaneously rotating both sheets into a heating station (c) simultaneously heating the thermoplastic sheets beyond their glass-transition temperature, (c) simultaneously rotating the thermoplastic sheets into a forming station, (d) simultaneously forming the sheets with vacuum molds, and (e) immediately fusing the formed sheets.

The present invention provides a simple and effective twinsheet thermoforming method and apparatus for the simultaneous heating and forming of two thermoplastic sheets. The simultaneous heating and rotation into the forming station allows the two sheets to enter the forming stations at the same time and at the same temperature. Because the sheets may be simultaneously formed, they are fused together a minimum amount of time after both sheets are heated, ensuring a high temperature to maximize the strength of fusion.

The present invention expands the range of materials that can be used in twinsheet thermoforming. A number of thermoplastics with tight thermoforming temperature ranges, such as acrylic and ABS, were previously incapable of being molded in a twinsheet thermoforming system. The improved timing of the simultaneous twinsheet system enables the use of these materials with the present invention.

The present invention also saves energy, as less pressure is required in the fusion process due to the high temperature and favorable material properties of the thermoplastic at the time of fusion. Furthermore, the present invention is manufactured with only limited changes in conventional twinsheet forming systems, and saves floor space with the removal of an entire heating station used in conventional twinsheet systems.

These and other objects, advantages, and features of the invention will be readily understood and appreciated by reference to the detailed description of the preferred embodiment and the drawings.

DETAILED DESCRIPTION OF THE INVENTION

I. Overview

Figure 1:
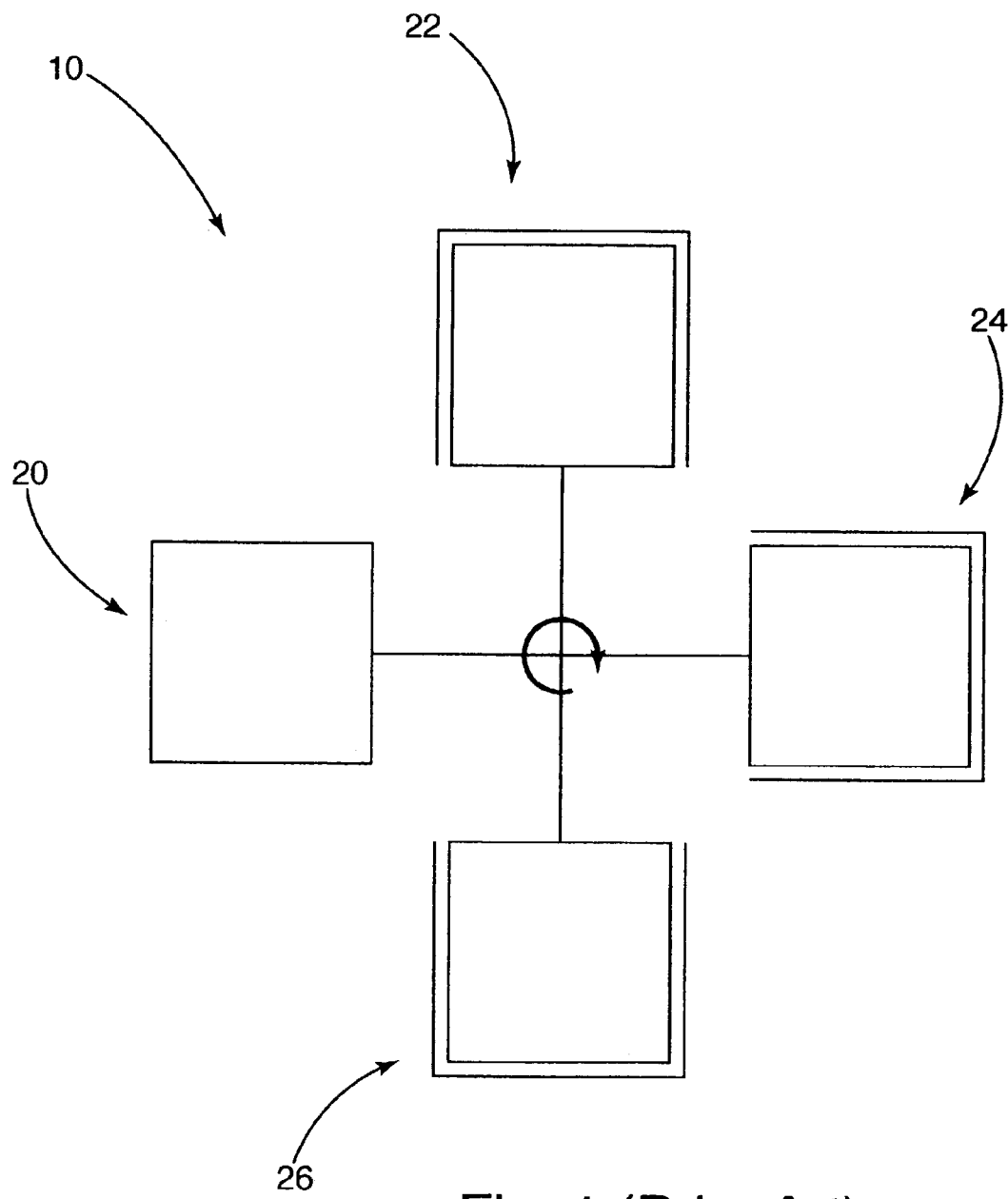
FIG. 1 is a top view representation of a prior art twinsheet thermoforming system.
Figure 2:
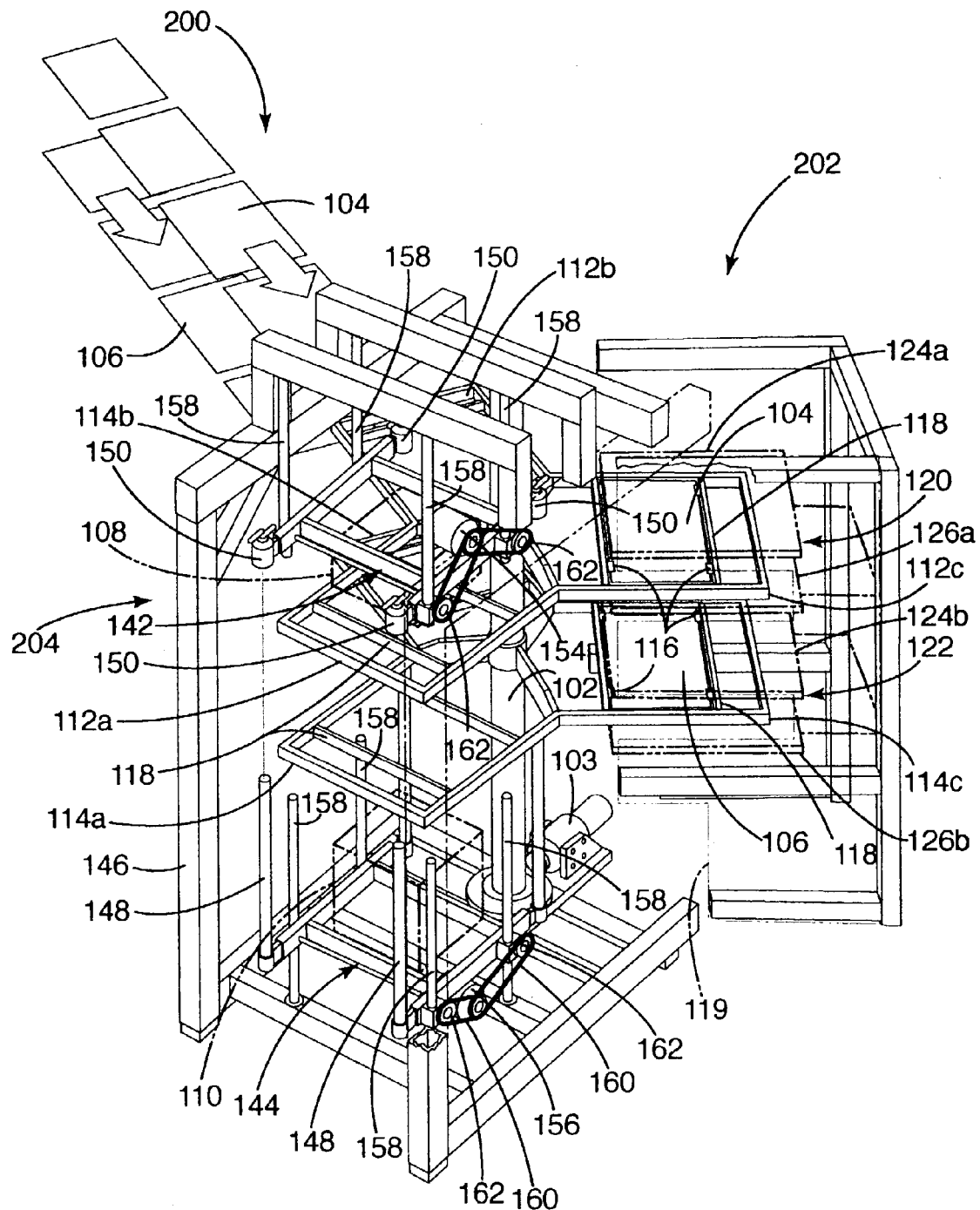
FIG. 2 is a perspective view of a thermoforming apparatus of the present invention with portions removed to show internal components.

A twinsheet thermoforming system in accordance with a preferred embodiment of the present invention is shown in FIG. 2 and generally designated 100. The twinsheet apparatus generally includes a movable rack 102 that carries first and second thermoplastic sheets 104, 106 together through various stages of a thermoforming process; a loading station 200 for loading sheets 104, 106 onto rack 102; a heating station 202 for heating thermoplastic sheets 104, 106; and a forming station 204 for forming the sheets 104, 106. In operation, two thermoplastic sheets 104, 106 are loaded onto a rack 102 at loading station 200, then carried by the rack to heating station 202 where they enter the station simultaneously and are heated above their glass transition temperature. Next, the two sheets 104, 106 are transported by the rack 102 to the forming station 204 to be thermoformed in first and second molds 108, 110 and then fused together.

II. Structure

As noted above, the rack 102 functions to carry pairs of sheets 104, 106 through the stages of the thermoforming process. In a preferred embodiment, the rack 102 is a conventional rotary device (or carousel) that rotates through a horizontal plane about a vertical axis. As shown in FIG. 2, the rack 102 is configured somewhat like a rotary fan, with multiple, radially-spaced rack arms 112a–c, 114a–c, so that multiple operations may be performed on multiple pairs of sheets at the same time. Because the system 100 includes three stations, the arms 112a–c, 114a–c are preferably spaced radially symmetrically about the rack 102 at a spacing of approximately 120 degrees. In order to transport two sheets at a time from station to station, the rack arms are disposed in two tiers. Upper 112a–c, and lower 114a–c tiers of rack arms support the first 104 and second 106 thermoplastic sheets is a spaced vertical relationship. The spacing between the two sheets 104, 106 must be sufficient to accommodate any sheet sagging that may occur as the sheets are heated. In the described embodiment, the racks 112a–c, 114a–c are vertically spaced approximately 30 inches. This spacing may vary from application to application depending on the characteristics of the materials to be formed. In summary, the multiple rack arms 112a–c, 114a–c permit the simultaneous loading, heating, and forming of separate pairs of thermoplastic sheets 104, 106. More specifically, first and second sheets 104, 106 arrive on a conveyor (not shown) and are loaded onto upper 112a–c, and lower 114a–c rack arms of rack 102 at loading station 200. At the same time, two previously loaded sheets 104, 106 are heated at the heating station 202 by ovens 120, 122 and two more previously loaded and heated sheets are formed at forming station 204 by molds 108, 110.

Figure 3:
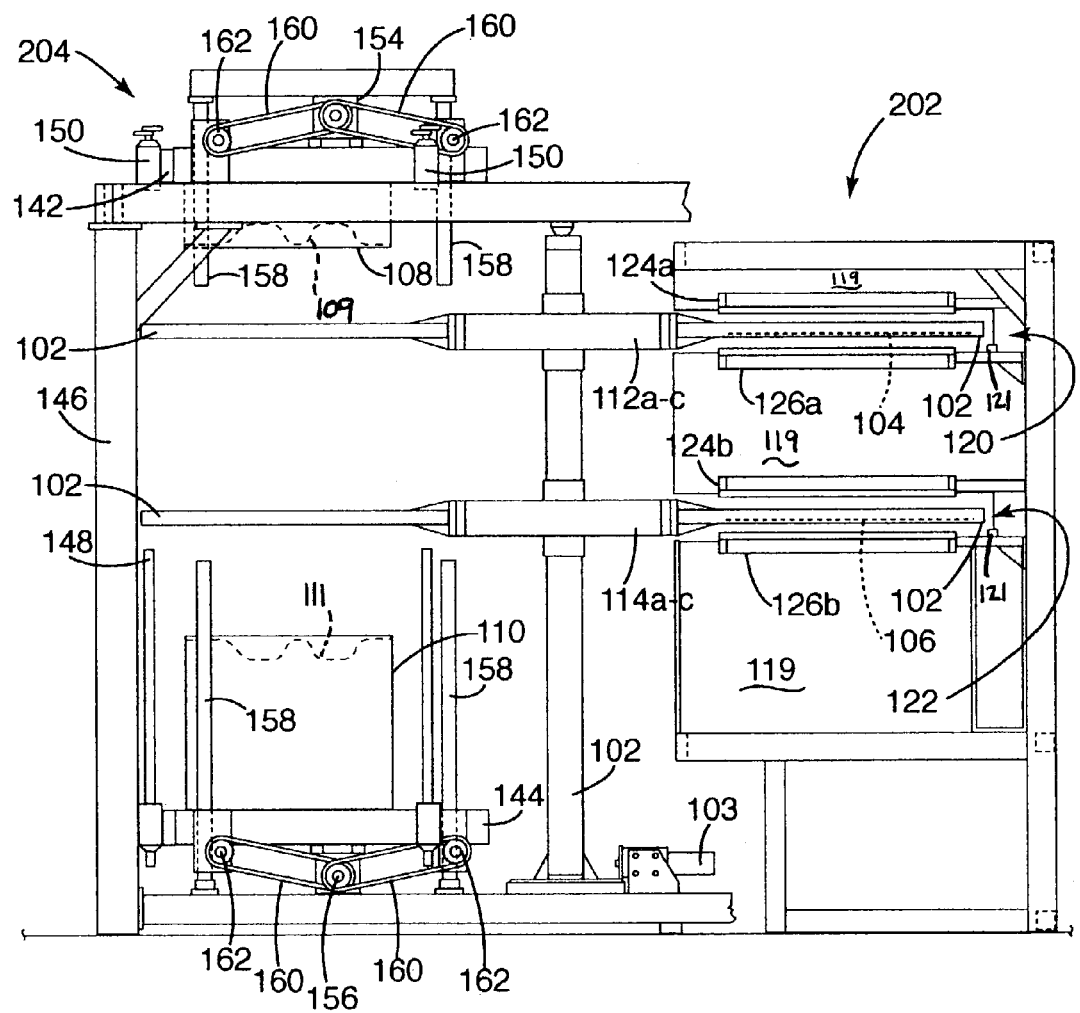
FIG. 3 is a side elevational view of the thermoforming apparatus with portions removed to show internal components of the heating station and the forming station.

The rack 102 includes support members 118 that are disposed within the rack arms to support the sheets 104, 106. The support members 118 are generally conventional, and each includes a plurality of clamps 116 arranged around the support member 118 to grip the peripheral edges of the sheet 104, 106. In the described embodiment, the clamps 116 are conventional pneumatic clamps. The pneumatic clamps 116 may be replaced by electromechanical, hydraulic, manually-actuated or other conventional clamps. The loading station 200 is generally conventional and will not be described in much detail here. Briefly, sheets 104, 106 are fed from a conveyor and loaded onto support members 118 at loading station 200, while clamps 116 are in an open position. As noted above, each set of rack arms includes two tiers, such that loading requires placing a first thermoplastic sheet 104 in the clamps of the upper rack arms 112a–c, and then placing a second thermoplastic sheet 106 in the clamps of the lower rack arms 114a–c for each rotation of the rack 102. The clamps 116 are then closed to hold the thermoplastic sheets 104, 106 in a fixed position. As shown in FIG. 3, the rack 102 also includes a conventional gear drive assembly 103 and control (not shown), which turns the rack arms 112a–c, 114a–c through the various stations. Specifically, the gear drive 103 functions to rotate the rack 102 in fixed increments. In the described embodiment, the three stations are spaced around the rack 102 at 120 degree intervals. Accordingly, in the described embodiment, the gear drive 103 indexes the rack 102 in 120 degree increments. This causes each pair of arms 112a–c, 114a–c to index through the loading station 200 then the heating station 202 and then the forming station 204. Operation of the gear drive 103 is preferably controlled using a conventional automated control system (not shown). The carousel rack 102 of the described embodiment may be replaced by other conventional rack configurations, such as a linear carriage. Further, the gear drive 103 may be replaced by other conventional drive mechanisms.

Figure 4:
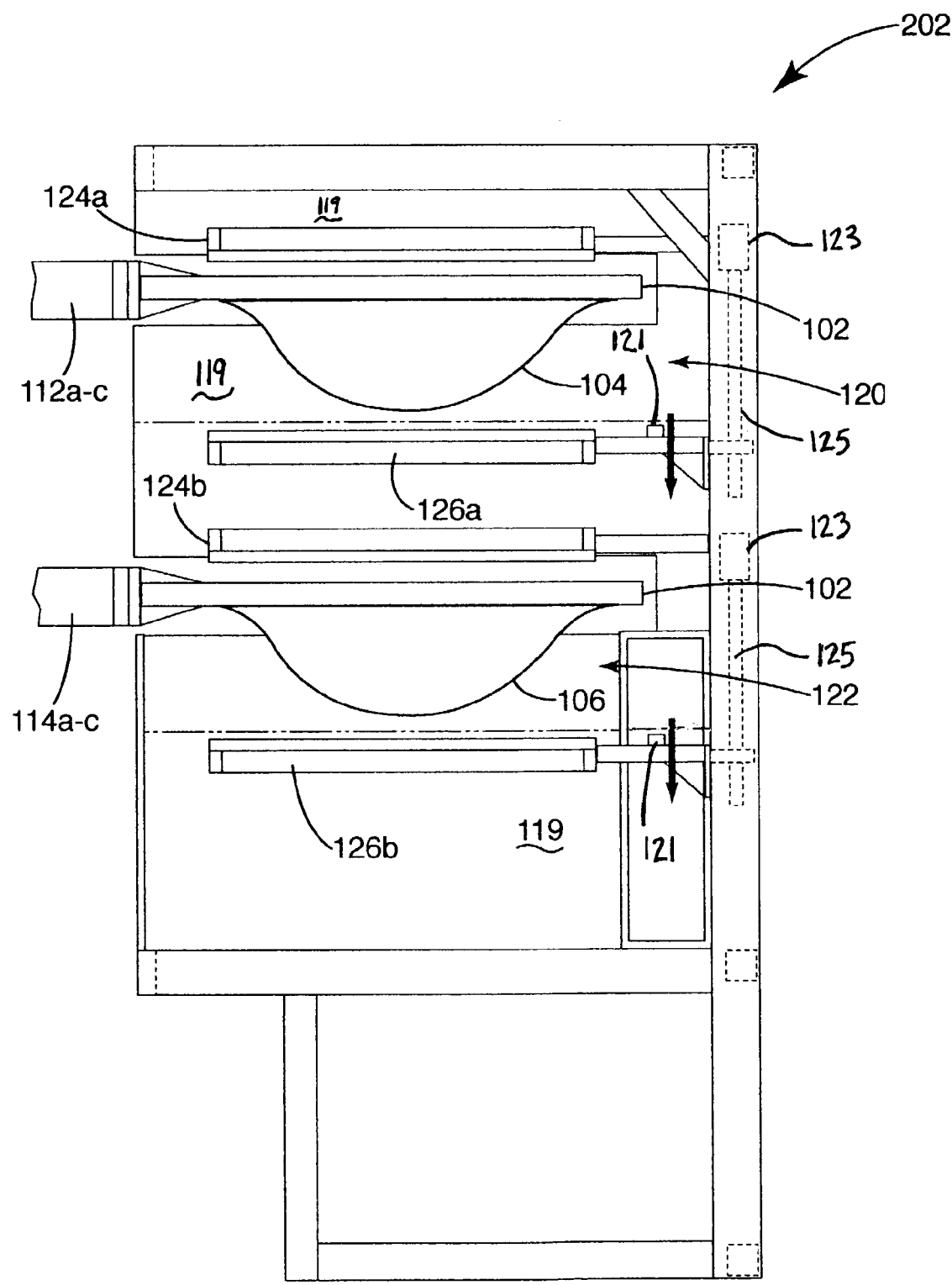
FIG. 4 is a side elevational view of the heating station with portions removed to showing sagging sheets on the upper and lower rack arms.

As shown in FIGS. 3 and 4, the heating station 202 includes a support shroud 119 surrounding an upper oven 120 and a lower oven 122 (See also, phantom lines in FIG. 3). In general, the lower oven 122 is disposed directly below the upper oven 120. The ovens 120, 122 are generally conventional and will accordingly not be described detail. In short, the ovens 120, 122 of the described embodiment may be any radiant, convection, infrared or other conventional oven, and are preferably provided with standard controls. In a preferred embodiment, the support shroud 119 is a box like structure that guards the ovens 120, 122 but is open on the sides and in front, preventing contact with the ovens from the outside, yet allowing the rack 102 to rotate through the ovens unimpeded. To permit viewing of the internal components of the heating station 202, portions of the shroud 199 are removed in FIGS. 2, 3 and 4. The exit openings in the shroud 119 are larger than the entry openings to allow sagging sheets to be moved out of the heating station 202. In summary, the loaded sheets 104, 106 are rotated together on rack 102 from loading station 200 to heating station 202 such that the first sheet 104 on upper rack arms 112a–c rotates through the upper oven 120 and the second sheet 106 on lower rack arms 114a–c rotates through the lower oven 122. The sheets 104, 106 are heated at the same time and then rotated by rack 102 out of the heating station 202 to forming station 204.

The ovens 120, 122 each generally include an upper heating platen 124a–b, and a lower heating platen 126a–b to provide uniform heating of the surface area of sheets 104, 106. The platens are generally rectangular in shape and are connected to the outer wall of the support shroud 119 in a cantilever fashion. The upper 124a–b and lower 126a–b heating platens of each oven define a horizontal gap that is coextensive with the horizontal plane of the rotating rack arms such that the first 104 and second sheets 106 pass through the upper and lower gaps simultaneously as the rack 102 rotates. In a preferred embodiment, the lower platens 124b, 126b are selectively movable to accommodate for any sagging of the thermoplastic sheets 104, 106 as they are heated. FIG. 3 shows the lower platens 124b and 126b in the upper position, while FIG. 4 shows the lower platens 124b and 126b in the lowered position. In general, movable oven platens are conventional and thus they will not be discussed in detail here. Briefly, conventional controls, such as an infrared eye sensor 121, detect when the sagging thermoplastic gets too close to the platen and actuate a drive motor, such as motor 123, pneumatic cylinder or other similar mechanism that lowers the platen to accommodate for the displacement (See FIG. 4). In this embodiment, the motor 123 rotates a threaded rod 125 that is operatively connected to the platen. By operation of the motor 123, the platen can be selectively raised or lowered. In a preferred embodiment, the platens are capable of lowering approximately 30" to accommodate a 30" displacement of thermoplastic. Alternatively, the platens may be permanently affixed to the support shroud 119, spaced from the upper platens at a distance greater than the largest displacement of the thermoplastic sheets 104, 106.

Figure 5:
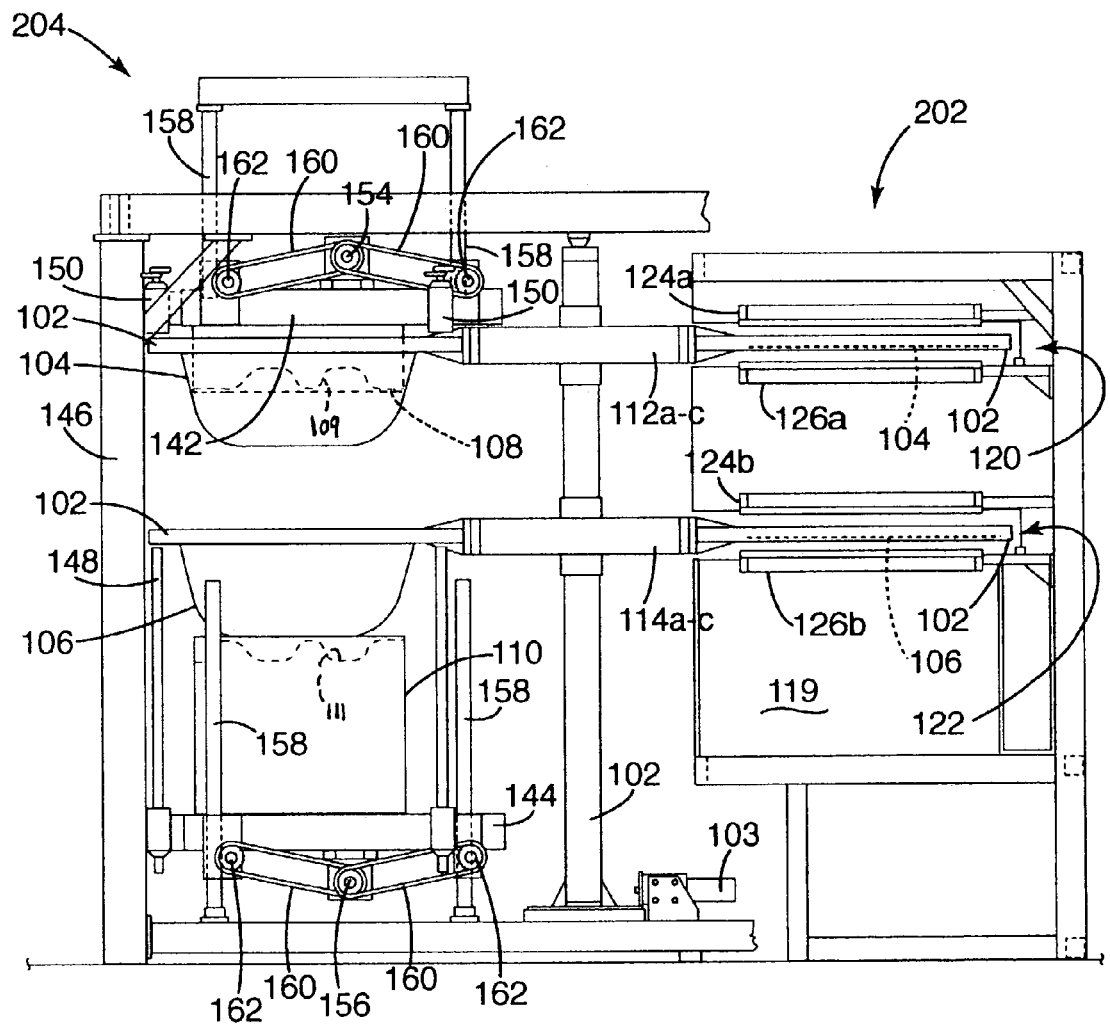
FIG. 5 is a side elevational view of the thermoforming apparatus with portions removed to show the forming station molds in the vacuum forming position.
Figure 6:
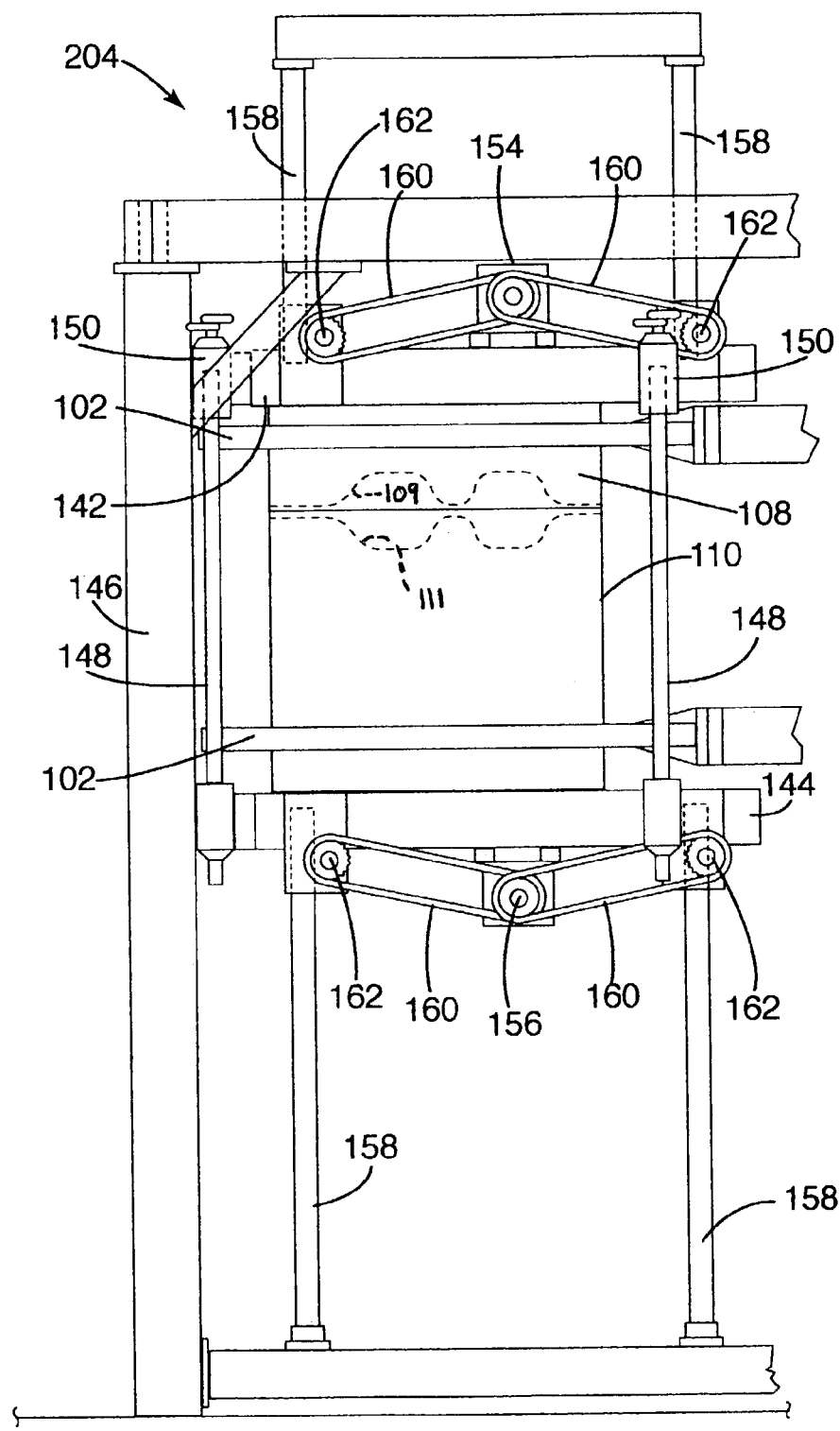
FIG. 6 is a side elevational view of the forming station with portions removed to show the molds in the fusing position.

As perhaps best shown in FIGS. 3, 5 and 6, the forming station 204 generally includes an upper vacuum mold 108 (represented schematically by a box in the figure) and a lower vacuum mold 110. The molds 108, 110 each include three-dimensional faces (represented schematically by contoured lines 109 and 111) that are, in a conventional manner, shaped to correspond with the desired product. In a preferred embodiment, the molds are disposed such that the face of upper mold 108 is directly aligned and facing the face of lower mold 110. The molds include a conventional means for vacuum forming, which is widely known and will not be discussed in detail here. Briefly, the molds contact the periphery of the thermoplastic sheets, and a vacuum is actuated to draw the thermoplastic over the mold, forming the thermoplastic to the shape of the mold.

The molds 108, 110 are vertically movable by an actuation system 136 that selectively drives the molds 108, 110 from an open position defining a gap between the molds, to a closed position in which the faces 130, 132 are in contact. In general, the actuation system 136 includes a support frame 146; upper and lower platens 142, 144 which support the upper and lower molds 108, 110 respectively; four locator lances 148 with corresponding locator sleeves 150 for aligning the mold faces; and upper and lower chain gear motors 154, 156 with toothed rods 158 for driving the molds together. In summary, the rack 102 rotates heated sheets 104, 106 into the forming station while the molds 108, 110 are in their open position (See FIG. 3). The actuation system 136 then drives the molds toward each other until the molds contact the thermoplastic sheets so that vacuum forming can occur (See FIG. 5). Then, the sheets are vacuum formed to a desired shape (e.g. the shape of the molds). At this time, the clamps 116 of either the upper or lower rack 112a–c, 114a–c are opened to release one of the two sheets from its corresponding support member 118. The mold 108, 110 corresponding to the released sheet 104, 106 is then further moved to bring the two formed sheets 104, 106 into contact under pressure, causing the formed sheets 104, 106 to fuse together at the contact points (See FIG. 6). Once the thermoformed sheets are sufficiently cured, the molds are reopened (or retracted), for example, to the position shown in FIG. 3. The twinsheet thermoformed product remains clamped to one of the two support members 118. The rack 102 is then indexed forward another 120 degrees to move the twinsheet thermoformed product from the forming station 204 to the loading/unloading station 200.

The platens 142, 144 support the molds 108, 110 and are generally rectangular in shape. In a preferred embodiment, the upper mold 108 is supported underneath the upper platen 142, and the lower mold 110 sits on top of the lower platen 144. Each platen defines four holes (not shown), one near each corner, allowing toothed rods 158 to pass through. The toothed rods 158 are rigidly and immovably mounted to the support frame 146 such that four rods 158 extend down from the top of the frame 146 and four rods 158 extend up from the bottom. Chain gear motors 154, 156 are attached to the platens 142, 144 opposite the molds 108, 110. Each motor includes two chains 160, which are attached to gear assemblies 162 that ride on toothed rods 158, allowing the platens 142, 144 to be driven up and down the toothed rods 158 from open to closed positions. Although not illustrated, each gear assembly 162 includes a drive gear that is operatively connected to the motor by a chain 160 and a pair of spur gears mounted toward opposite ends of an axle. The spur gears engage teeth formed in rods 158. The various gears are fixedly secured to the axle so that the entire assembly rotates as one unit. In operation, each motor 154, 156 drives the corresponding drive gear. This in turn causes rotation of the entire gear assemblies 162. Interaction of the spur gears with the teeth in rods 158 causes the platens 142, 144 to move vertically along the rods 158. The rods 158 are long enough for the mold faces 130, 132 to contact when the molds 108, 110 are in the closed position. As an alternative to the chain drive assembly of the described embodiment, the molds 108, 110 may be actuated by any other conventional means, such as hydraulic or pneumatic cylinders.

The system 100 preferably includes a lance/sleeve assembly to facilitate proper alignment of the molds 108, 110 as they close together. As illustrated in FIGS. 2, 3, 5 and 6, the lower platen 144 includes four locator lances 148. The lances 148 are generally fixed metal rods extending up from each corner of the lower platen 144. The upper platen includes four conical sleeves 150 that are each aligned vertically with a lance 148. As the molds are driven into the closed position, the lances 148 each slide into a sleeve 150 to assure that the mold faces have been properly aligned. The lances 148 and sleeves 150 of the illustrated embodiment include a conventional interlocking mechanism to lock the molds in the closed position. In this particular embodiment, the interlocking mechanism is a conventional quarter-turn "bayonet-type" mechanism that rotates either the sleeves 150 of the lances 148 to interlock the two component. The quarter-turn mechanism is preferably automated, for example, by operation of a solenoid (not shown), but may be manually operated, if desired.

III. Operation

In operation, two thermoplastic sheets 104, 106 are loaded onto the rack 102 at a loading station 200. More specifically, one set of upper and lower rack arms 112a, 114a is positioned adjacent loading station 200. Clamps 116 are opened to prepare the rack 102 to receive the sheets 104, 106. The first sheet 104 is then positioned on the support members 118 of the upper rack arms 112a with its peripheral edges located between the open jaws of clamps 116. Next, a second sheet 106 is similarly positioned on the clamps of the lower rack arms 114a. Once the sheets 104, 106 are positioned, the clamps 116 close to grip the peripheral edges of the sheet 104. As noted above, the pneumatic clamps 116 can be replaced by other clamping mechanisms capable of selectively securing the sheets 104, 106 to the support members 118.

The rack 102 then rotates to advance the sheets 104, 106 to a heating station 202. In the described embodiment, the rack 102 is a carousel-type rack, automated by a gear-driven motor 103. The rack 102 may alternatively be replaced by a conventional in-line track-fed system to move sheets 104, 106 to different stations. If desired, the rack 102 may alternatively be moved manually. A conventional computer control system (not shown) preferably controls operation of the rack 102 and the various work stations The loaded sheets 104, 106 rotate into heating station 202, such that the upper sheet 104 enters the gap between the platens 124a, 126a of the upper oven 120 and the lower sheet 106 enters the gap between the platens 124b, 126b of the lower oven 122 (See FIG. 3). The ovens 120, 122 apply the desired amount of heat energy simultaneously to the sheets 104, 106. Typically the sheets 104, 106 will be heated a predetermined number of degrees above their glass transition temperature. As the sheets 104, 106 are heated and begin to sag towards the lower platens 126a–b, the displacement is sensed by an infrared eye (not shown) (or other conventional sensor) and the lower platens 126a–b are moved to accommodate for the displacement (See FIG. 4). The rack 102 is again indexed forward 120 degrees carrying the heated sheets to the forming station 204.

In the forming station, the rack arms 112a, 114a, align the sheets 104, 106 in between the open molds 108, 110 (See FIG. 3). Next, the actuation system 136 begins to drive the molds together as conventional motors 154, 156 turn chains 160, which drive gears 162 along toothed rods 158. The molds 108, 110 close such that the upper mold face 130 contacts the upper sheet 104 and the lower mold face 132 contacts the lower sheet 106 (See FIG. 5). At this time, the sheets 104, 106 are simultaneously drawn over the molds 108, 110 by vacuum and formed into the desired shape. Although the described embodiment includes vacuum molds, the present invention may alternatively include other conventional molds.

Once the sheets 104, 106 are drawn fully over the vacuum molds 108, 110, the clamps 116 of the lower rack arms 114a release from the lower sheet 106. After the sheets 104, 106 have been formed, the actuation system 136 continues to raise the lower mold 110, lifting the lower sheet 106 into contact with the second sheet 104 still carried on the upper mold 108. The desired pressure is applied by the lowering mold 110 causing the two sheets to fuse together at the locations of contact (See FIG. 6). Once the thermoplastic is sufficiently cured, the actuation system 136 begins to retract the molds 108, 110, and a completed part remains attached to the clamps 116 of the upper rack arms 112a. Finally, the rack 102 indexes forward another 120 degrees, rotating the rack arms 112a and 114a to the loading station, where the clamps 116 of the upper rack arms 112a open and the completed part may be removed by hand or by conventional machine. The empty rack arms 112a, 114a are then ready to be reloaded with new thermoplastic sheets such that the process may be repeated.

IV. Alternative Embodiment

An alternative embodiment of the present invention utilizes an in-line workstation arrangement instead of the aforementioned rotational arrangement. A rack with upper and lower tiers carries two sheets down the line from a loading station to a heating station to a forming station. The track may be moved by rolling manually on wheels, or by an automated track mounted to the floor or an overhead conveyor. Assembly line conveyors and tracks are conventional and thus the details of the track will not be discussed in detail here. Multiple racks may be used so that sheets may be at different stations at the same times. In general, the setup and function of the heating station and forming station are the same as in the preferred embodiment.

The above description is that of the preferred embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A twinsheet thermoforming apparatus, comprising:
a first station including first and second vertically disposed ovens, said ovens providing simultaneous heating of a first and second sheet of thermoplastic;
a second station including a first vacuum mold, a second vacuum mold, and a mold actuation system, said first and second molds facing each other, providing simultaneous forming of said first and second sheets, said molds selectively movable by said mold actuation system from an open position providing a gap between said molds to a closed position wherein portions of said first and second sheets contact each other; and
a rack including a plurality of vertically spaced sheet receiving openings to hold and support said first and second thermoplastic sheets, the vertically spaced sheet receiving openings only movable in respective single planes without relative vertical movement therebetween, wherein said rack moves said first and second vertically spaced sheet receiving openings simultaneously only in their respective single planes without relative vertical movement to said first station and said second station, wherein said mold actuation system moves at least one of said vacuum molds at least partially through at least one of said sheet receiving openings, and wherein the sheet receiving openings are vertically spaced such that one of said thermoplastic sheets is released from its sheet receiving opening so that said first and second thermoplastic sheets are brought into contact by said at least one of said vacuum molds without moving said rack and sheet receiving openings vertically or horizontally.

2. The thermoforming apparatus of claim 1 wherein said rack is a rotatable carousel.

3. The thermoforming apparatus of claim 2 wherein said rack includes a first and second tier, each of said tiers including multiple, radially spaced rack arms, said rack arms joined by supporting cross members that provide pneumatic clamps for selectively holding and releasing the periphery of said thermoplastic sheets.

4. The apparatus of claim 2, wherein both of said first and second ovens include upper and lower heating platens, said heating platens defining a horizontal gap coextensive with the translational plane of a thermoplastic sheet supported by said rack.

5. A twinsheet thermoforming apparatus, comprising:
a first station including first and second vertically disposed ovens, said ovens providing simultaneous heating of a first and second sheet of thermoplastic;
a second station including first and second vacuum molds, said first and second molds facing each other, providing simultaneous forming of said first and second sheets and selectively movable from an open position providing a gap between molds to a closed position wherein portions of said first and second sheets contact each other;
a rack including a plurality of vertically spaced sheet receiving openings, the rack being supportive of said first arid second thermoplastic sheets, wherein said rack moves said first and second sheets simultaneously to said first station and said second station, wherein said rack is a rotatable carousel,
wherein both of said first and second ovens include upper and lower heating platens, said heating platens defining a horizontal gap coextensive with the translational plane of a thermoplastic sheet supported by said rack, wherein said thermoplastic sheets sag when heated by said first and second ovens, wherein said ovens are each provided with an infrared eye to measure the displacement of such sag, wherein said heating platens are selectively vertically movable to accommodate for such sag, preventing said thermoplastic from contacting said oven.

6. The apparatus of claim 5, wherein the position of said upper heating platens is fixed, and said lower heating platens are selectively movable.

7. The thermoforming apparatus of claim 6, wherein each of said vacuum molds is vertically actuated by a rack and pinion apparatus, said pinion driven by a chain, said chain driven by a conventional motor.

8. The apparatus of claim 7, wherein one of said molds includes at least one locator lance, said lance corresponding with a sleeve on the opposing mold, wherein said lance interacts with said sleeve to align the mold faces in said closed position.

9. A method for twinsheet thermoforming, comprising:
loading first and second thermoplastic sheets onto a sheet transporting rack, said rack having a plurality of vertically spaced rack arms defining a plurality of vertically spaced central openings, wherein each of said first and second thermoplastic sheets is held by at least one rack arm over one of said central openings;
moving said vertically spaced rack arms each along a single plane into first and second ovens such that said first and second sheets held over the vertically spaced central openings enter said first and second ovens at the same time;
heating said sheets simultaneously in said ovens;
simultaneously transporting each of said first and second thermoplastic sheets held by said vertically spaced rack arms along said single planes without relative vertical movement therebetween from said ovens to first and second vacuum molds, such that said first and second sheets are aligned between said molds at the same time;
forming the heated sheets in said first and second vacuum molds; and
driving said molds together through at least one of said central openings without moving said rack arms and central openings vertically or horizontally and releasing one of said heated sheets from its rack arm such that at least one of said molds passes at least partially through said rack when said sheets are fused together.

10. The method of claim 9, wherein said moving step includes rotating the sheets to and from said ovens and said vacuum molds simultaneously on a carousel rack.

11. The method of claim 10, wherein the sheets are vertically disposed on first and second tiers of said rack and transported into first and second vertically disposed ovens such that the first sheet enters a horizontal gap in the first oven and the second sheet enters a horizontal gap in the second oven at the same time.

12. A method for twinsheet thermoforming, comprising:
loading first and second thermoplastic sheets onto a sheet transporting rack;
moving said rack into first and second ovens such that said first and second sheets enter said first and second ovens at the same time;

heating said sheets simultaneously in said ovens;
moving the lower platens of said first and second ovens vertically away from said sheets when an infrared eye senses that said sheets are sagging;
simultaneously transporting said rack from said ovens to first and second vacuum molds, such that said first and second sheets are aligned between said molds at the same time;
forming the heated sheets in said first and second vacuum molds; and
driving said molds together such that said sheets are fused together;
wherein said moving step includes rotating the sheets to and from said ovens and said vacuum molds simultaneously on a carousel rack; and
wherein the sheets are vertically disposed on first and second tiers of said rack and transported into first and second vertically disposed ovens such that the first sheet enters a horizontal gap in the first oven and the second sheet enters a horizontal gap in the second oven at the same time.

13. The method of claim 12, comprising transporting said sheets on said tiers of said rack from said ovens to said vacuum molds at the same time.

14. The method of claim 13, comprising driving said vacuum molds from an open position to a closed position, such that the molds are open when said sheets arrive in said molds, and thus begin to close, wherein said molds contact said sheets as they close, drawing said sheets over said molds, wherein said molds continue to close until the portions of said sheets contact and fuse together.

15. A thermoforming apparatus, comprising:
first and second thermoplastic sheets;
a sheet carriage for simultaneous transportation of said first and second sheets only along vertically spaced first and second planes without relative movement between the sheets, said sheets being secured to said carriage, wherein said sheet carnage defines a first opening coplanar to said first sheet and a vertically spaced second opening coplanar to said second sheet;
first and second ovens, said ovens accommodating movement of said carriage through said ovens for heating said sheets simultaneously, said carriage moving said sheets only along a said first and second planes;
first and second molds, wherein said sheets are simultaneously transported only along said first and second planes without relative vertical movement to said molds by said carriage after they are heated in said ovens;
a mold actuation system for driving said molds together at least partially through at least one of said first opening and said second opening while said sheet carriage and openings remain vertically and horizontally stationary to simultaneously form said first and second sheets and for selectively moving said sheets into contact with one another, wherein the first and second openings are vertically spaced such that one of said thermoplastic sheets is released from said sheet carriage during mold actuation to move said sheets into contact.

16. The apparatus of claim 15, wherein said first oven is disposed directly above said second oven.

17. The apparatus of claim 16, wherein said carriage rotates said sheets from said ovens to said molds, wherein the carriage contains multiple rack arms for simultaneously supporting a first set of said sheets in said ovens, a second set of sheets in said molds, and a third set of sheets in a position for loading and unloading.

18. The apparatus of claim 17, wherein said carriage is selectively rotated by a gear drive motor.

19. A thermoforming apparatus, comprising:
first and second thermoplastic sheets;
a sheet carriage for simultaneous transportation of said first and second sheets, said sheets being secured to said carriage;
first and second ovens, said ovens accommodating movement of said carriage through said ovens for heating said sheets simultaneously, wherein said first oven is disposed directly above said second oven;
first and second molds, wherein said sheets are simultaneously transported to said molds by said carriage after they are heated in said ovens; and
a mold actuation system, for driving said molds together to simultaneously form said first and second sheets and for selectively moving said sheets into contact with one another;
wherein said carriage rotates by a gear drive motor said sheets from said ovens to said molds, wherein the carnage contains multiple rack arms for simultaneously supporting a first set of said sheets in said ovens, a second set of sheets in said molds, and a third set of sheets in a position for loading and unloading; and
wherein said thermoplastic sheets sag when heated in said ovens, wherein said ovens are provided with an infrared eye for sensing the displacement of said sagging sheets and pneumatic cylinders for vertically moving a lower oven surface to accommodate for said displacement.

20. The thermoforming apparatus of claim 19, wherein said vacuum molds are vertically disposed and include motors, such that said molds can be driven together along a vertical axis.

21. The thermoforming apparatus of claim 20, wherein said motors are chain gear motors, said motors each driving a set of chains, said chains each driving gears in a rack and pinion arrangement.

22. The thermoforming apparatus of claim 21, wherein said carriage includes pneumatic clamps for clamping around the periphery of said sheets, wherein the clamps for one of said sheets are released after it is formed by one of said molds, wherein the clamps of the other sheet are released after said sheets are fused and rotated out of said molds.

23. A twinsheet thermoforming apparatus comprising:
a rack having vertically spaced upper and lower sheet supporting arms for supporting upper and lower sheets one above the other, said rack including a drive mechanism for moving said rack such that said upper and lower sheet supporting arms each move only along single upper and lower planes without vertical movement relative to said rack and relative to each other;
a heating station having vertically spaced upper and lower ovens for simultaneously heating upper and lower sheets;
a forming station having vertically spaced upper and lower molds for simultaneously forming upper and lower sheets; and
a mold actuation system for driving said molds together through said supporting arms for bringing said upper and lower sheets into contact while in said forming station and without moving said upper and lower arms vertically or horizontally, wherein said upper and lower supporting arms are vertically spaced such that one of said sheets is released from its supporting arm during mold actuation to move said sheets into contact.

24. The apparatus of claim 23 wherein said rack is a carousel rack.

25. The apparatus of claim 24 wherein each of said ovens includes an upper heating platen and a lower heating platen.

26. The apparatus of claim 25 wherein each of said molds are selectively and simultaneously movable to a forming position for simultaneously thermoforming upper and lower sheets.

27. A method for twinsheet thermoforming, comprising the steps of:
- mounting upper and lower sheets to a rack having a plurality of rack openings with the upper sheet being substantially aligned and vertically spaced from said lower sheet, wherein the sheets are supported over the openings;
- simultaneously moving the upper and lower sheets into a heating station having vertically spaced upper and lower ovens, said upper sheet moving only along an upper plane and said lower sheet moving only along a lower plane;
- simultaneously heating the upper and lower sheets in the upper and lower ovens;
- simultaneously moving the heated upper and lower sheets along said upper and lower planes without relative vertical movement from the heating station to a forming station having vertically spaced upper and lower molds;
- simultaneously and separately forming the upper and lower sheets to the upper and lower molds; and
- following said forming step, moving at least one of the molds through at least one of the openings in the rack without moving the openings vertically or horizontally and releasing one of said sheets from its opening to place at least portions of the first and second sheet into contact to fuse the two sheets into a single twinsheet product, whereby the first and second sheet can be fused together without moving the rack openings.

* * * * *

UNITED STATES PATENT AND TRADEMARK OFFICE
CERTIFICATE OF CORRECTION

| | | |
|---|---|---|
| PATENT NO. | : 7,045,086 B2 | Page 1 of 1 |
| APPLICATION NO. | : 10/388080 | |
| DATED | : May 16, 2006 | |
| INVENTOR(S) | : James Richard Fitzell, Jr. | |

It is certified that error appears in the above-identified patent and that said Letters Patent is hereby corrected as shown below:

Column 11, Claim 15, Line 38:
 "carnage" should be --carriage--

Column 11, Claim 15, Line 44:
 delete "a"

Column 12, Claim 19, Line 21:
 "carnage" should be --carriage--

Signed and Sealed this

Twenty-first Day of November, 2006

JON W. DUDAS
*Director of the United States Patent and Trademark Office*